United States Patent

Hongawa et al.

(10) Patent No.: US 10,102,980 B2
(45) Date of Patent: Oct. 16, 2018

(54) NEGATIVE-ELECTRODE ACTIVE MATERIAL FOR LITHIUM ION CAPACITOR

(71) Applicant: NIPPON CARBON CO., LTD., Chuo-ku, Tokyo (JP)

(72) Inventors: Ken-ichi Hongawa, Omihachiman (JP); Kazuaki Yamashita, Otsu (JP)

(73) Assignee: NIPPON CARBON CO., LTD., Chuo-ku, Tokyo (JP)

( * ) Notice: Subject to any disclaimer, the term of this patent is extended or adjusted under 35 U.S.C. 154(b) by 130 days.

(21) Appl. No.: 15/100,098

(22) PCT Filed: Dec. 1, 2014

(86) PCT No.: PCT/JP2014/081769
§ 371 (c)(1),
(2) Date: Oct. 24, 2016

(87) PCT Pub. No.: WO2015/080288
PCT Pub. Date: Jun. 4, 2015

(65) Prior Publication Data
US 2017/0040124 A1 Feb. 9, 2017

(30) Foreign Application Priority Data
Nov. 29, 2013 (JP) ................................ 2013-247109

(51) Int. Cl.
| | | |
|---|---|---|
| *H01G 11/42* | (2013.01) | |
| *H01G 11/50* | (2013.01) | |
| *C01B 32/20* | (2017.01) | |
| *C01B 32/205* | (2017.01) | |
| *H01G 11/06* | (2013.01) | |
| *H01G 11/86* | (2013.01) | |
| *H01M 4/96* | (2006.01) | |
| *H01M 12/00* | (2006.01) | |
| *H01G 11/24* | (2013.01) | |
| *H01G 11/38* | (2013.01) | |
| *H01G 11/34* | (2013.01) | |
| *H01M 4/587* | (2010.01) | |
| *H01M 4/133* | (2010.01) | |
| *H01M 4/36* | (2006.01) | |
| *H01M 4/1393* | (2010.01) | |
| *H01M 10/0525* | (2010.01) | |

(52) U.S. Cl.
CPC .............. *H01G 11/50* (2013.01); *C01B 32/20* (2017.08); *C01B 32/205* (2017.08); *H01G 11/06* (2013.01); *H01G 11/24* (2013.01); *H01G 11/34* (2013.01); *H01G 11/38* (2013.01); *H01G 11/42* (2013.01); *H01G 11/86* (2013.01); *H01M 4/96* (2013.01); *H01M 12/005* (2013.01); *H01M 4/133* (2013.01); *H01M 4/1393* (2013.01); *H01M 4/364* (2013.01); *H01M 4/587* (2013.01); *H01M 10/0525* (2013.01); *Y02E 60/13* (2013.01); *Y02T 10/7022* (2013.01)

(58) Field of Classification Search
CPC ........ H01G 11/50; H01G 11/34; H01G 11/38; H01G 11/24; H01G 11/42; H01G 11/06; H01G 11/86; H01M 12/005; H01M 4/96; H01M 10/0525; H01M 4/1393; H01M 4/133; H01M 4/364; H01M 4/587; Y02T 10/7022; Y02E 60/13; C01B 32/20; C01B 32/205
See application file for complete search history.

(56) References Cited

U.S. PATENT DOCUMENTS

2009/0311599 A1* 12/2009 Kawai .................. H01M 4/587
429/217

FOREIGN PATENT DOCUMENTS

| JP | 2006-265005 A | 10/2006 |
|---|---|---|
| JP | 2008-050237 A | 3/2008 |
| JP | 2008-150270 A | 7/2008 |
| JP | 2010-135648 A | 6/2010 |
| JP | 2010-267875 A | 11/2010 |

OTHER PUBLICATIONS

English machine translation of JP2008-150270 (2008).*
English machine translation of JP2008-050237 (2008).*
English translation of the International Preliminary Report on Patentability and Written Opinion of the International Searching Authority for PCT/JP2014/081769 (6 pgs.).
English language International Search Report for PCT/JP2014/081769 (2 pgs.).

* cited by examiner

*Primary Examiner* — Richard M Rump
(74) *Attorney, Agent, or Firm* — Flynn Thiel, P.C.

(57) ABSTRACT

A negative electrode active material for lithium ion capacitor, which reduces the thickness of a negative-electrode active material layer while maintaining the conventional level of energy density.
The negative-electrode active material is a composite carbon material manufactured by kneading a carbon black having an average particle diameter of 12 to 300 nm with a carbon precursor such as pitch, the resulting mixture is baked or graphitized baking between 800° C. to 3200° C., and then pulverized such that the average particle diameter ($D_{50}$) thereof is 1 to 20 μm and the BET specific surface area is between 100-350 m²/g. An initial charging capacity is at least 700 mAh/g, and the cell volume is reduced as the thickness of the negative electrode active material layer becomes thinner than the conventional one.

1 Claim, No Drawings

NEGATIVE-ELECTRODE ACTIVE MATERIAL FOR LITHIUM ION CAPACITOR

TECHNICAL FIELD

The present invention relates to porous carboneous powder used as a negative electrode active material for a lithium ion capacitor, which is manufactured by a process of kneading a carbon black with a carbon precursor and followed by baking and pulverizing.

BACKGROUND ART

In the automobile industry, because of environmental issues, electric and the hybrid cars having an internal combustion engine combined with an electric motor driven by electricity supplied from a battery have been developed, and are now in the marketplace and in practical use. A nickel metal hydride rechargeable battery, a lithium ion rechargeable battery, or an electric double layer capacitor are used as batteries and the lithium ion capacitor has attracted attention recently.

A battery which is installed in the automobiles as a power supply means should have both a high output property and a high energy density. The lithium ion capacitor has a high output property which is not accomplished by a lithium ion battery and has a high energy density property which is not accomplished by an electric double layer capacitor. Therefore, the lithium ion capacitor has attracted attention as a future battery.

A positive electrode of the lithium ion capacitor consists of an active carbon which is used in the electric double layer capacitor and a negative electrode consisting of a carbon material which is capable of storing and releasing lithium ions.

In the lithium ion battery, at an initial lithium ion charging, a SEI film is formed on the negative electrode. Therefore, the initial charge-discharge efficiency never reaches 100%. As the lithium ion capacitor works under the same principle as the lithium ion battery, it is natural that an initial charge-discharge efficiency of the lithium ion capacitor is less than 100%.

In the lithium ion capacitor, because lithium ions are pre-doped to the carbon materials of the negative electrode, the capacity of the negative electrode is high and also the electric potential of the negative electrode becomes low. Consequently, an energy density of the lithium ion capacitor becomes 4 times as much as a conventional electric double layer capacitor and, further, test results of a high temperature load test and a cycle test are satisfactory and a long term reliability of the products is expected.

In a patent publication of document 1 (JP2008-150270), we disclosed porous carboneous powder for a negative electrode of a lithium ion capacitor, which is a composite carbon material of a carbon black and a carbonaceous precursor.

A development of a higher energy density lithium ion capacitor is expected. A proposed effective solution to the goal of a higher energy density capacitor is to reduce the volume of a cell of the lithium ion capacitor by making the thickness of the layer of the negative active material thinner while keeping the energy density unchanged.

For the purpose of keeping the energy density unchanged when the cell volume is reduced, it is necessary to increase the amount of doped lithium ions, which is interpreted as to increase the initial charge capacity per unit weight of the negative electrode when a lithium metal of the negative active material is used as a counter electrode.

However, the negative electrode active material disclosed in patent document 1 does not exhibit a desired performance and a good result in an initial charge capacity per unit weight of the negative electrode and the purpose of increasing the energy density of the lithium ion capacitor is not yet achieved.

PRIOR ART DOCUMENTS

Patent Documents

JP2008-150270

DISCLOSURE

Technical Problem

A purpose of this invention is to increase the amount of doped lithium ions in a negative electrode active material. That is, to increase the initial charge capacity per unit weight of the negative electrode when a lithium metal of the negative active material is used as a counter electrode and, consequently, enabling high energy density electric charging.

Technical Solution

An invention of this application is a negative active material for a lithium ion capacitor comprising a composite carbon material of carbon black and a carbon precursor, manufactured by kneading carbon black having an average diameter of 12-300 nm measured by the electron microscope method with a carbon precursor and baking the kneaded mixture at a temperature of 800° C.–3200° C., followed by pulverizing into an average diameter ($D_{50}$) of 1-20 μm, preferably 5-20 μm, wherein the BET specific surface area of the porous carbonaceous composite material is above 100 $m^2/g$ and less than 350 $m^2/g$.

An average diameter of the pulverized particles ranges preferably between 1-20 μm. When the average diameter exceeds 20 μm, a thickness of a layer formed on a surface of a metal foil of the electrode by applying and drying a slurry mixture of the negative active material with a binder becomes comparatively thick and it is difficult to make the electric resistance low. In addition, on the other hand, if the average diameter is smaller than 1 μm, the carbon material particles do not disperse uniformly among the binder which is a burden for forming the slurry and lowers the workability of the slurry production.

Therefore, an average diameter between 5 to 20 μm is preferable from the view point of the workability of the production of the slurry.

The BET specific surface area of the carbon material of the present invention is preferably less than 300 $m^2/g$ and more than 150 $m^2/g$, and more preferably less than 240 $m^2/g$ and more than 180 $m^2/g$.

If the BET specific surface area is more than 100 $m^2/g$, when using a lithium metal in the negative electrode material as a counter electrode, an initial charging capacity of the negative active material becomes higher than 700 mAh/g and maintains the stored energy the same, even if the lithium ion capacitor cell volume is reduced, and a high energy density lithium ion capacitor may be obtained.

On the other hand, when the BET specific surface area becomes excessively large, a bonding area of the negative electrode active material becomes too large to bond firmly on the surface of the copper foil electrode, therefore, the layer of the carboneous material is likely to peel off from the surface of the electrode.

Consequently, the BET specific surface area of the carboneous material should be lower than 350 m$^2$/g and then a coating applicability of the negative material slurry on the surface of the electrode is superior.

In the negative electrode active material for a lithium ion capacitor of the present invention, it is preferable to knead a mixture of 100 parts by weight of carbon black and 30 to 200 parts by weight of a carbon precursor. More preferably, the mixing ratio is 100 parts by weight of carbon black and 30 to 150 parts by weight of a carbon precursor.

From a view point of a weight ratio of the carbon black and the carbon precursor, if the carbon precursor is more than 30 parts by weight against 100 parts by weight of the carbon black, due to an effect of a complexed carbon black and the carbon precursor, a high energy output characteristic of the lithium ion capacitor is realized.

Further, if the carbon precursor is less than 200 parts by weight against 100 parts by weight of the carbon black, the BET specific surface area of the negative electrode active material is controlled within a desirable range and the initial charge capacity per unit weight of the negative electrode is increased, when a lithium metal of the negative active material is used as a counter electrode.

The negative active material for a lithium ion capacitor of the present invention comprises a composite carbon material which is manufactured by kneading carbon black having an average diameter of 12-300 nm and BET specific surface area of 200-1500 m$^2$/g with a carbon precursor and baking or graphitizing the kneaded mixture at a temperature from 800° C. to 3200° C., followed by pulverizing into an average diameter ($D_{50}$) of 1-20 μm, preferably 5-20 μm.

A measuring method of the characteristics of the carbon black particles in this specification is an electron microscopy method, wherein photographing several shots of the particles with some hundred magnifying degree, measuring 2000-3000 particles with an auto image analyzing device. (pp. 4 "Carbon black Manual", 3rd edition, published May 25, 1973 by Toshyo Shyuppan Co., Ltd)

In the present invention, the carbon precursors can be selected solely or a mixture of at least 2 kinds from a coal or petroleum pitch, or phenol resin, franc resin, di-vinyl benzene resin. Among the aforementioned carbon precursors, the pitches of any kind are cost effective.

The above mentioned carbon black and carbon precursor are kneaded in a heating kneader and the mixture is baked or graphitized at a temperature of 800-3200° C. under a non-oxidative atmosphere. If the baking temperature is below 800° C., the functional groups on the surface of the particles remain and react with Li ions and cause the undesirable results of an increase of a capacity loss or a generation of an inflection point at around 1 V in a discharge curve.

If the process of the heat treatment temperature exceeds 3400° C., the products of the graphitized particles sublimate, therefore, an upper limit of baking or graphitizing temperature of this invention is 3200° C.

The baked or graphitized product is pulverized to an average particle diameter ($D_{50}$) of 1-20 μm, preferably 5-20 μm. After the pulverization, if necessary, additional baking or graphitizing at a temperature of 800-3200° C. may be conducted. The particle size measuring method of the pulverized particles is a laser diffractometry. (MT-3300EX by Nikkiso Co., Ltd.).

The negative active material for a lithium ion capacitor of the present invention is a composite porous carboneous material having fine pores and manufactured by kneading a carbon black having an average diameter of 12-300 nm with a carbon precursor and baking or graphitizing the kneaded mixture and characteristics of the product are as follows.

In an isotherm of nitrogen gas physical absorption and desorption of the negative active material for the lithium ion capacitor of the present invention, up to the relative pressure ($P/P_0$) of a nitrogen gas of around 0.8, the changes in the nitrogen gas adsorption amount is small but when the relative pressure exceeds 0.8, the nitrogen gas adsorption amount suddenly rises.

The relative pressure ($P/P_0$) of nitrogen gas is around 0.99, an adsorption amount of nitrogen is 10-100 cm$^3$/g and a volume of pores of a diameter less than 2 nm is less than 20% of the whole volume of the pores.

The carbon material as a negative electrode active material having the above described special structure and characteristics, exhibits the properties of both a high output and high energy density.

The raw materials of the negative electrode active materials for the lithium ion capacitor of the present invention are carbon black and a carbon precursor, both of which are low cost materials, and the porous carbon product of this invention is manufactured by a simple process consisting of mixing, baking and pulverizing.

Furthermore, a selection of the carbon black type and changing the mixing ratio of the carbon black and carbon precursor, it is possible to control the fine pore structure of the carbon product.

Advantages of the Invention

A lithium ion capacitor using the negative electrode active material of the present invention has a property of an initial charge capacity per unit weight of the negative electrode when a lithium metal of the negative active material is used as a counter electrode is more than 700 mA/g and an energy density is higher than that of the conventional negative electrode active material, thereby the volume of the lithium ion capacitor can be reduced.

PREFERRED EMBODIMENTS OF THE INVENTION

More detailed explanation of the invention will be described hereinafter for a better understanding of this invention showing embodiments and comparative examples. Needless to say, the scope of the invention is not limited to the following embodiments.

Characteristics of the obtained negative electrode active material, BET specific surface area, initial charging capacity, amount of nitrogen gas adsorption at a relative pressure ($P/P_0$)=0.9 and volume of micro pores/whole pores are indicated in Table 1.

Embodiment 1

100 parts by weight of carbon black having an average diameter of 30 nm and BET specific surface area of 254 m$^2$/g and 50 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized such that the average particle diameter ($D_{50}$) is 2 μm to obtain a negative electrode active material for a lithium ion capacitor.

Embodiment 2

100 parts by weight of carbon black having an average diameter of 30 nm and BET specific surface area of 1000 m$^2$/g and 100 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized such that the average particle diameter ($D_{50}$) is 2 μm to obtain a negative electrode active material for a lithium ion capacitor.

Embodiment 3

100 parts by weight of carbon black having an average diameter of 30 nm and BET specific surface area of 1000 m$^2$/g and 30 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized such that the average particle diameter ($D_{50}$) is 2 μm to obtain a negative electrode active material for a lithium ion capacitor.

Embodiment 4

100 parts by weight of carbon black having an average diameter of 30 nm and BET specific surface area of 254 m$^2$/g and 30 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized such that the average particle diameter ($D_{50}$) is 2 μm to obtain a negative electrode active material for a lithium ion capacitor.

Embodiment 5

100 parts by weight of carbon black having an average diameter of 30 nm and BET specific surface area of 1000 m$^2$/g and 150 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized such that the average particle diameter ($D_{50}$) is 2 μm to obtain a negative electrode active material for a lithium ion capacitor.

Embodiment 6

100 parts by weight of carbon black having an average diameter of 30 nm and BET specific surface area of 1000 m$^2$/g and 200 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized to an average particle diameter ($D_{50}$) of 2 μm to obtain a negative electrode active material for a lithium ion capacitor.

Embodiment 7

The negative electrode active material for a lithium ion capacitor obtained by embodiment 3 is further baked under a non-oxidative atmosphere at a temperature of 2000° C. to obtain a negative electrode active material for a lithium ion capacitor.

Embodiment 8

A process the same as embodiment 2 except that the pulverized to average particle diameter ($D_{50}$) is 5 μm to obtain a negative electrode active material for a lithium ion capacitor.

Embodiment 9

A process the same as embodiment 2 except that the pulverized to average particle diameter ($D_{50}$) is 10 μm to obtain a negative electrode active material for a lithium ion capacitor.

Embodiment 10

A process the same as embodiment 1 except that 60 parts by weight of the optically isotropic pitch is used to obtain a negative electrode active material for a lithium ion capacitor.

Embodiment 11

100 parts by weight of carbon black having an average diameter of 34 nm and BET specific surface area of 1270 m$^2$/g and 100 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized to an average particle diameter ($D_{50}$) of 2 μm, to obtain a negative electrode active material for a lithium ion capacitor.

Comparative Example 1

100 parts by weight of carbon black having an average diameter of 48 nm and BET specific surface area of 39 m$^2$/g and 133 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized to an average particle diameter ($D_{50}$) of 2 μm so that a negative electrode active material for a lithium ion capacitor is obtained.

Comparative Example 2

100 parts by weight of carbon black having an average diameter of 48 nm and BET specific surface area of 39 m$^2$/g and 54 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized to an average particle diameter ($D_{50}$) of 2 μm to obtain a negative electrode active material for a lithium ion capacitor.

Comparative Example 3

100 parts by weight of carbon black having an average diameter of 24 nm and BET specific surface area of 117 m$^2$/g and 50 parts by weight of an optically isotropic pitch having a softening point of 110° C. and metaphase (QI) content of 13% are kneaded in a heating kneader, and the resulting mixture is baked under a non-oxidative atmosphere at a temperature of 1000° C. and then pulverized to an average particle diameter ($D_{50}$) of 12 μm to obtain a negative electrode active material for a lithium ion capacitor.

TABLE 1

|  | BET specific area $m^2/g$ | Initial charge capacity mAh/g | Nitrogen adsorption $P/P_0 = 0.99$ $cm^3/g$ | Micro pore volume/ Whole pore volume % |
|---|---|---|---|---|
| Embodiment 1 | 110 | 730 | 228 | 1.52 |
| Embodiment 2 | 240 | 1100 | 484 | 0.71 |
| Embodiment 3 | 330 | 1400 | 989 | 0.52 |
| Embodiment 4 | 123 | 749 | 281 | 1.29 |
| Embodiment 5 | 180 | 935 | 292 | 1.59 |
| Embodiment 6 | 117 | 729 | 230 | 1.42 |
| Embodiment 7 | 180 | 935 | 621 | 0.17 |
| Embodiment 8 | 246 | 1130 | 575 | 0.33 |
| Embodiment 9 | 242 | 1120 | 520 | 0.26 |
| Embodiment 10 | 100 | 700 | 180 | 1.75 |
| Embodiment 11 | 350 | 1600 | 995 | 0.21 |
| Comparative example 1 | 24 | 334 | 30 | 2.89 |
| Comparative example 2 | 31 | 424 | 57 | 2.12 |
| Comparative example 3 | 53 | 634 | 165 | 1.16 |

The measurement method of the necessary data in the embodiments of this invention and the comparative examples of the BET specific surface area, fine pore volume, and pore diameter are all measured with a device utilizing the principle of nitrogen adsorption and desorption, which is an automated gas adsorption analyzer, Tristar 300 made by Micromeritics.

The detailed process of determining the BET specific surface area is as follows;

Measuring a nitrogen volume by an isotherm, which is evaluated according to the multi point measurement method assuming the adsorbed nitrogen, is a mono layer.

$$P/V(P_0-P)=(1/VmC)+\{(C-1)/VmC\}(P/P_0) \quad (1)$$

$$S=kVm \quad (2)$$

$P_0$: Saturated vapor pressure
P: Adsorption equilibrium pressure
V: Volume of adsorption at adsorption equilibrium pressure P
Vm: Quantity of monolayer adsorption
C: Parameter related to adsorption heat
S: Specific surface area
k: Nitrogen monomolecular exclusive possession area; 0.162 $nm^2$ A whole pore volume is calculated based on a saturated gas volume assuming the equilibrium relative pressure neighborhood of $P/P_0=0.99$ obtained from the adsorption isotherm.

A micropore of less than diameter of 2 nm is obtained by the t-plot method in which adsorbed nitrogen gas layer thickness t is plotted against the volume of adsorption. The thickness of the adsorption layer is obtained based on an equation of Harkins & Jura when the range of thickness t is between 0.35-0.50 nm.

$$t=[13.99/\{0.034-\log(P/P_0)\}]^{0.5} \quad (3)$$

$P_0$: Saturated vapor pressure
P: Adsorption equilibrium pressure

The measurement of the particle diameter is conducted using MT3300EX system made by NIKKISO Co., Ltd., dispersing the particles in water containing a small amount of a surfactant with an aid of a supersonic mixer.

Measurement of an initial charging capacity is as follows; Preparing a water slurry comprising 100 parts by weight of a negative electrode active material and 5 parts each by weight of a SBR and CMC as a binder and applying the water slurry on the copper foil thickness of 300 μm, drying the layer at a temperature of 120° C., pressing the layer by a roll, then punching it to Φ 12 mm to obtain an electrode of 50 μm thick. The electrodes are assembled as test coin cells inserting separators between the electrodes with a counter electrode of metal lithium and filling an electrolyte of 1M $LiPF_6$/EC:DEC(3:7) and charging-discharging tests are conducted.

Tests are conducted at a temperature of 25° C., charging with a constant current of 0.5 $mA/cm^2$ until a voltage reaches 0.01V, followed by a constant voltage charging until the current value reading reaches 0.01 $mA/cm^2$.

INDUSTRIAL APPLICABILITY

A lithium ion capacitor using the negative electrode active material of the present invention has a property of an initial charge capacity per unit weight of the negative electrode when a lithium metal of the negative active material is used as a counter electrode is more than 700 mA/g and the energy density is higher than that of the conventional negative electrode active material, thereby the volume of the lithium ion capacitor can be reduced.

The invention claimed is:

1. A method of manufacturing a negative electrode active material for a lithium ion capacitor comprising the steps of kneading 100 parts by weight of carbon black having an average diameter of 12-300 nm, as measured by an electron microscope, and BET specific surface area of 254-1500 $m^2/g$ with a 30-200 parts by weight of a carbon precursor to form a kneaded mixture, baking or graphitizing the kneaded mixture at a temperature of 800° C.-3200° C., followed by pulverizing to form a product having an average diameter ($D_{50}$) of 1-20 μm, and BET specific surface area of above 110 $m^2/g$ and less than 350 $m^2/g$.

* * * * *